US006470000B1

(12) United States Patent
Burns et al.

(10) Patent No.: US 6,470,000 B1
(45) Date of Patent: Oct. 22, 2002

(54) SHARED CORRELATOR SYSTEM AND METHOD FOR DIRECT-SEQUENCE CDMA DEMODULATION

(75) Inventors: Geoffrey F. Burns, Macungie; Ravi K. Kolagotla, Lansdale, both of PA (US)

(73) Assignee: Agere Systems Guardian Corp., Miami Lakes, FL (US)

( * ) Notice: Subject to any disclaimer, the term of this patent is extended or adjusted under 35 U.S.C. 154(b) by 0 days.

(21) Appl. No.: 09/172,378

(22) Filed: Oct. 14, 1998

(51) Int. Cl.[7] ................................................ H04J 13/00
(52) U.S. Cl. ........................ 370/342; 370/441; 375/150
(58) Field of Search ................................. 370/335, 342, 370/441; 375/147, 150, 151

(56) References Cited

U.S. PATENT DOCUMENTS 5,671,221 A * 9/1997 Yang .......................... 370/320

* cited by examiner

Primary Examiner—Melvin Marcelo
(74) Attorney, Agent, or Firm—Steve Mendelsohn; Ian M. Hughes (57) ABSTRACT

A shared correlator system and method for a code division, multiple access (CDMA) receiver employs pipeline processing and information tags for sharing vector generation and correlation operations between processing units. A signal input to the CDMA receiver is provided as, for example, In-phase channel (I) and quadrature-phase channel (Q) sample vectors $I_{REC}$ and $Q_{REC}$. Sample vectors $I_{REC}$ and $Q_{REC}$ are applied to the shared correlator of the CDMA receiver. Processing units request correlation operations by the shared correlator in which matched filter pseudo-noise (PN) vectors are correlated with the I and Q sample vectors $I_{REC}$ and $Q_{REC}$. The shared correlator schedules correlation operations requested by processing units, generates matched-filter, PN vectors with associated identification tags for the correlation operations, and provides correlation results for the correlation operations. The shared correlator renders a shared task correlation system, and includes pipeline processing and identification tags to increase correlation bandwidth and facilitate result distribution to shared tasks.

36 Claims, 8 Drawing Sheets

SHARED CORRELATOR SYSTEM AND METHOD FOR DIRECT-SEQUENCE CDMA DEMODULATION

BACKGROUND OF THE INVENTION

1. Field of the Invention

The present invention relates to code division, multiple access (CDMA) communication systems, and, more particularly, to a shared, vector correlator of a CDMA receiver.

2. Description of the Related Art

Several code division, multiple-access (CDMA) standards have been proposed, and one such standard is the IS-95 standard adopted for cellular telephony. As with many CDMA systems, IS-95 employs both a pilot channel for a base station and data, or message, channels for communication by the base station and users. The base station and users communicating with the base station each employ assigned, pseudo-random sequences, also known as pseudo-noise (PN) code sequences, for spread-spectrum "spreading" of the channels. The assigned PN code sequence is a sequence of a predetermined number of bits. For each user transceiver, the PN code sequence is used to spread data transmitted by the transceiver and to despread data received by the transceiver. The PN code sequence is used for both In-phase (I) and Quadrature-phase (Q) channels, is a sequence with a known number of bits, and is transmitted at a predetermined clock rate.

Each bit-period, or phase transition, of the PN code sequence is defined as a chip, which is a fraction of the bit-period of each data symbol. Consequently, the PN code sequence is combined with the data sequence so as to "spread" in frequency the frequency spectrum of the data. In IS-95, for example, 64 chips represent one data symbol. The pilot channel and each user are also assigned a different Walsh code that is combined with the spread channel to make each spread channel signal orthogonal. The pilot channel is assigned the all zeros Walsh code. An exclusive-OR combination of the zero Walsh code with the PN code sequence of the I and Q channels, respectively, leaves the PN code sequence of the pilot channel unaltered. No data symbols are spread or transmitted on the pilot channel.

To determine when a signal is transmitted, and to synchronize the reception and processing of a transmitted signal, IS-95 specifies a search finger correlating a known portion of the PN code sequence, for example, an IS-95 pilot epoch, with the sampled received signal. The pilot epoch is the time interval over which a pseudo-noise (PN) code sequence of a pilot signal repeats. The known portion of the IS-95 pilot epoch is the first 64 chips output from I-phase and Q-phase PN sequence generators subsequent to a rollover state. The beginning of the pilot epoch is the rollover state, and is the state at which the I-phase sequence and Q-phase sequence in respective PN generators have the same logic value in all register stages of the PN sequence is a multiple of 2. Additional logic may be required to insert the extra value into each sequence following 14 consecutive 1's or 0's. The extra value renders a $2^{15}$ chip period PN sequence. Consequently, for systems such as IS-95, at the beginning of the pilot epoch the value in the first register stage is forced to a logic "1" prior to the next state transition from the all zero register state.

Demodulation of a spread signal received from a communication channel requires synchronization of a locally generated version of the PN code sequence with the embedded PN code sequence in the spread signal. Then, the synchronized, locally generated PN code sequence is correlated against the received signal and the cross-correlation extracted between the two. For a user channel, the signal of the extracted cross-correlation is the despread data signal. For IS-95 systems, demodulation begins by first synchronizing a local code sequence pair, one for the I-phase spread data channel (I-channel) and one for the Q-phase spread data channel (Q-channel), with an identical pair of PN code sequences embedded in the signal received from the communication channel.

Communication systems are often subject to transmission path distortion in which portions, or paths, of a transmitted signal arrive at a receiver, each portion having different time offsets and/or carrier phase rotation. Consequently, the transmitted signal appears as a multiplicity of received signals, each having variations in parameters relative to the transmitted signal, such as different delays, gains and phases. Relative motion between a transmitter and receiver further contribute to variations in the received signal. The receiver desirably reconstructs the transmitted signal from the multiplicity of received signals.

A type of receiver particularly well suited for reception of multipath, spread spectrum signals is a RAKE receiver. The RAKE receiver comprises several search fingers to cross correlate each multipath signal with an offset version of the local PN code sequence. The RAKE receiver optimally combines the multipath signals received from the various paths to provide an extracted cross-correlated signal with high signal-to-noise ratio (SNR). The RAKE receiver may be analogized to a matched-filter where the path gains of each search finger, like the taps of a matched-filter, may be estimated to accurately detect a received multipath, spread spectrum signal. Since a transmitted signal is subject to many types of distortion as it passes through a communication channel to a receiver (i.e., multipath effects, Rayleigh fading, and Doppler shifts), the receiver must estimate the path gains utilizing the transmitted signal as distorted at the receiver. Thus, the detected received signal will only be as good as the path gain estimation of each search finger in the RAKE receiver.

U.S. Pat. Nos. 5,448,600; 5,442,661; 5,442,627; 5,361,276; 5,327,455; 5,305,349; and 5,237,586, the disclosures of which are hereby incorporated by reference, each describe a RAKE receiver. In RAKE receivers, for each fractional chip increment, a correlation with the pilot epoch is performed, which may be represented using the complex conjugate of the expected sequence, $x_r(n)+x_i(n)$, as $$cc_r(n) = \sum_{m=0}^{63} x_r(m) \cdot y_r(m+n\tau) + \sum_{m=0}^{63} x_i(m) \cdot y_i(m+n\tau) \quad (1)$$

and $$cc_i(n) = \sum_{m=0}^{63} x_r(m) \cdot y_i(m+n\tau) - \sum_{m=0}^{63} x_i(m) \cdot y_r(m+n\tau) \quad (2)$$

where:

n and m are integer counters $cc_r(n)$ are the real components of the cross-correlation $cc_i(n)$ are the imaginary components of the cross-correlation y is the sampled received signals x is the reference sequence (matched-filter PN vector sequence)

τ is a fractional chip

Thus, as can be seen from equations (1) and (2), four real correlations are performed in the process of performing one complex correlation.

The locally generated PN code sequence (the "local PN code sequence" or "reference PN code sequence") provides the basic elements for generating reference PN sequences, or matched-filter PN vectors, for matched-filter correlation against the received signal. Each PN code sequence is deterministic with a period of $2^{N-1}$ chips (PN values), N an integer greater than 1. The PN code sequence is identical between base-stations in an IS-95 system, and maybe augmented by one chip to provide a sequence with a period of $2^{15}$ chips. This PN code sequence is also known as the "short" code in IS-95 systems. The PN code sequence of each base-station is used for forward channel spreading, and in IS-95-based CDMA communication systems the code-phase offset of the PN code sequence is unique to a base-station. Therefore, to differentiate between base-stations, each base-station is assigned a unique time offset in the PN code sequence.

A PN code generator of an exemplary IS-95 system provides the code sequence for each of the I and Q channels recursively using a $15^{th}$ order polynomial, resulting in a period of, for example, $2^{15} - 1$ chips. The hardware realization for such a PN code generator is a shift register having 15 stages and with selected shift register outputs combined in modulo-2 addition to form the next PN code sequence value that is also the recursive input value to the beginning of the shift register.

Figure 1:
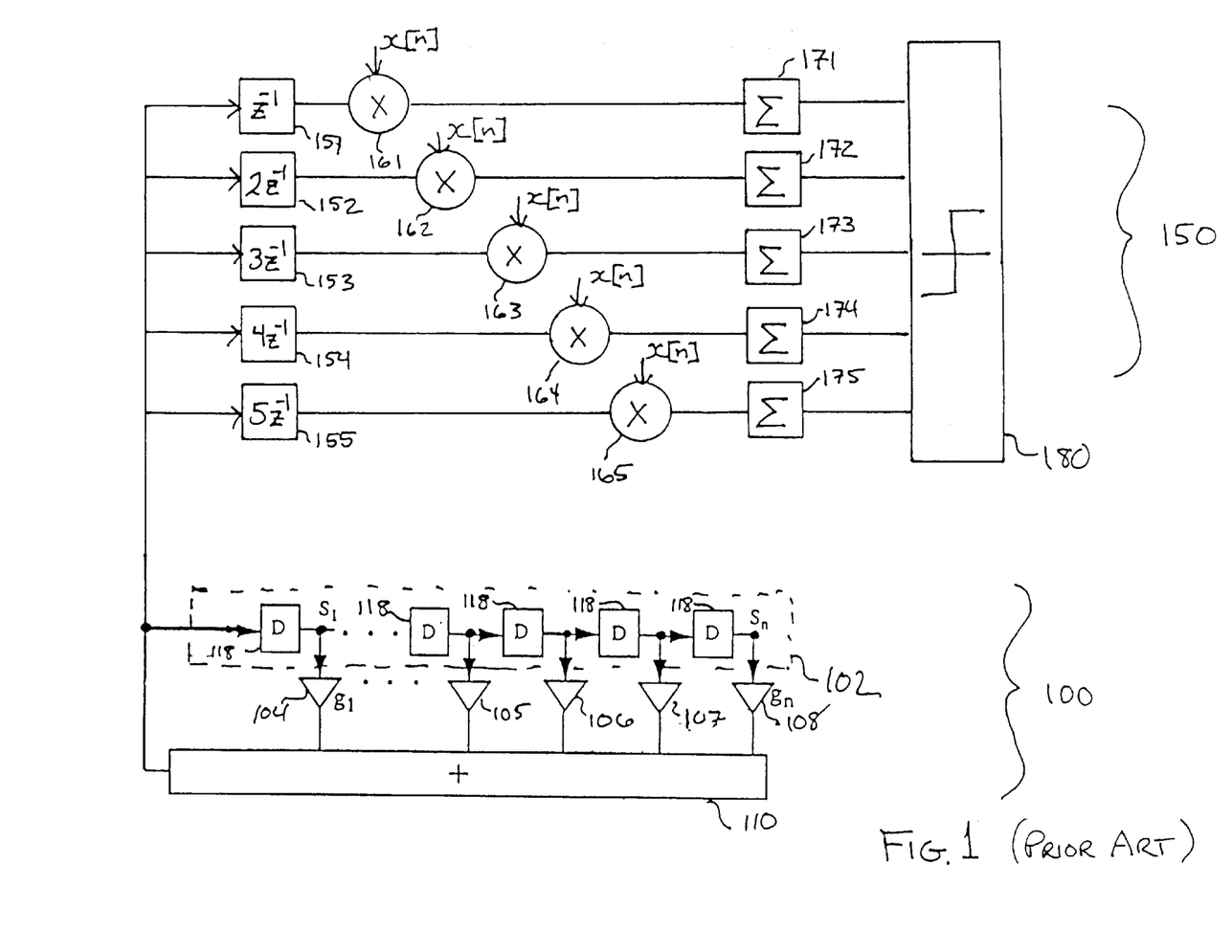
FIG. 1 shows a generalized pseudo-noise generator and a serial correlator of the prior art.

Referring to FIG. 1, there is shown a generalized pseudo-noise (PN) generator 100 as may be used to generate a PN code sequence and a serial correlator 150 that may be employed to correlate a portion of the PN code sequence with a received signal. Such serial correlator may also be employed in a matched-filter vector correlator. The hardware implementation of the PN generator 100 shown in FIG. 1 is of a Fibonacci type, but other types of generators, such as a Galois type, may be used. The generalized PN generator 100 as shown in FIG. 1 includes shift register 102, gain amplifiers 104, and modulo-2 adder 110. PN generator 100 may further include registers 111 and 112 and optional delay 113. In FIG. 1, gain amplifiers 104 have gain values $g_{[n:0]}$, that are the generating polynomial coefficients of the generating polynomial G. Also, $S=S_{[n:0]}$ is the state of shift register 102.

As is known in the art, PN generator 100 generates a code in the following manner. First, shift register 102 is loaded with a polynomial "seed" value. The seed value is typically one state of the shift register that forms a portion of the resulting PN sequence. Then, for each clock cycle, the value of the shift register is combined via gain amplifiers 104 in a modulo-2 adder 110. Each gain amplifier 104 adjusts the value in each corresponding stage of the shift register 102 according to generating polynomial coefficients. This is a cyclic process: the value in modulo-2 adder 110 is then applied to the first element of the shift register 102 and the last element is discarded. Each state of the shift register 102 may be loaded into storage registers for use with, for example, the I and Q channels, respectively.

The IS-95 system may augment the PN code sequence by inserting an extra value in the PN code sequence so that the PN code sequence is a multiple of 2. Additional logic (not shown in FIG. 1) inserts the extra value into each sequence following 14 consecutive 1's or 0's. The extra value renders a $2^{15}$ chip period PN sequence. Also, as is known in the art, a periodic bit sequence with a first code phase may be combined with another sequence to form the same periodic bit sequence with a second code phase. This process is known as masking. Consequently, a delayed, or offset, version of the sequence may be generated by modulo-2 addition of appropriate state bits of the shift register 102 with a selected mask. Additional logic for correcting the masked sequences may also be required if the PN code sequence is augmented.

Returning to FIG. 1, serial correlator 150 includes delays 151–155, multipliers 161–165, accumulators 171–175 and comparator 180. The delays 151–155 each receive the locally generated PN code sequence from the PN generator 100 and each provide a corresponding PN sequence with code-phase offset of, for example, $jz^{-1}$ chips, j an integer and $1 \leq j \leq 5$. The delay width $z^{-1}$ may be dependent on the type of process using the results of vector correlator 150. For example, $z^{-1}$ may be a quarter-chip width for code tracking, but may be one-chip width for searching. Multipliers 161–165 each multiply the received (sampled) signal x[n] with a corresponding one of the delayed PN code sequences to "despread" the signal. Accumulators 171–175 each accumulate the result from corresponding ones of multipliers 161–165 for a predetermined period, and comparator 180 compares the results to a predetermined threshold value. Each delay, multiply and accumulate chain may be considered a search finger. If the threshold value is exceeded by the result of the search finger, then the code-phase of the delayed PN code sequence matches the code-phase of the embedded code sequence in the signal of the search finger. The result of more than one search finger may exceed the threshold value of the comparator 180 if multipath signal components are present.

For a receiver in a CDMA system using a vector correlator, as would be apparent to one skilled in the art, many matched-filter PN vectors must be generated in a receiver. Each of the search, tracking and demodulation functions is typically performed by a processing unit, each of which employs one or more vector correlator circuits, such as the vector correlator 150 of FIG. 1. For example, in a receiver's acquisition or search mode the receiver determines whether the pilot signal is present. In acquisition or search mode, the search finger must search through all fractional chip offsets of the pilot epoch in order to locate the pilot signal. As described previously, each complex correlation actually requires four real correlations. Correlations of search fingers in a RAKE receiver are often performed against multiple, fractional-chip offsets simultaneously, such as during initial search or handoff between base-stations. If a receiver tracks several base stations, as may be required for handoff, then the acquisition mode process must occur for the pilot of each base station.

Further, even when synchronization is achieved when the pilot signal is present, a receiver's tracking mode must track several search fingers, and in the demodulation mode must demodulate a spread user channel. Further, data detection mode detects a signature sequence intended for the particular receiver. The signature sequence, in IS-95, may be a "long" PN code sequence for security (i.e., the sequence of the "long" PN code is relatively longer than the sequence of the "short" PN code). In the data detection mode, there are several sub-modes. The sub modes include a paging data mode, a synchronization data mode, and a traffic mode, all of which require correlation operations.

RAKE receivers require replication of hardware for each search finger performing simultaneous correlation operations, resulting in redundant hardware. Simultaneous correlation operations may be achieved using multiple parallel correlators and vector generators. Prior art methods for generating multiple, matched-filter PN vectors include either generating multiple, parallel PN code sequences, each with a different offset may be employed, or applying a set of parallel masks to a single PN code sequence, each applied mask generating a PN sequence having a different offset. However, where a large degree of correlation scheduling flexibility is required and many different matched-filter PN vectors are required for a single symbol period, the hardware requirements of these methods are impractical.

Serial correlators of the prior art assemble both an offset local PN code and a receive data sequence that are then provided in parallel to the correlator hardware. The multiplexing rate of a serial correlator is limited by its total latency from the initial multiplication, bit-wise addition and accumulation functions of the correlator. Interdependence of each execution stage in the serial correlator, as well as the chip rate of the spreading sequence, limits this multiplexing rate.

SUMMARY OF THE INVENTION

The present invention relates to a shared correlator performing different correlation operations of one or more processing units. The shared correlator generates CDMA correlation results for two or more different cross-correlation operations by multiplexing the different correlation operations. The shared correlator is adapted to generate a CDMA correlation result and a corresponding ID tag from each sample vector of a CDMA signal, and each cross-correlation operation selects one or more CDMA correlation results based on the corresponding ID tags.

In one embodiment, the shared correlator includes 1) a vector generator controller adapted to generate, based on each cross correlation operation, the ID tag and a state signal corresponding to at least one matched-filter PN vector; 2) a vector generator adapted to generate the at least one matched-filter PN vector based on the state signal; and 3) a vector correlator adapted to generate the CDMA correlation result from a vector pair. The vector pair includes one matched-filter PN vector and the sample vector, and the vector correlator associates the ID tag with the CDMA correlation result.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION

In accordance with the present invention, a shared correlator and method for a code division, multiple access (CDMA) receiver employs pipeline processing and information tags for sharing vector generation and correlation operations between processing units. A signal input to the CDMA receiver is provided as, for example, In-phase channel (I) and quadrature-phase channel (Q) sample sequences I and Q. Sample vectors $I_{REC}$ and $Q_{REC}$ are formed from sequences I and Q applied to the shared correlator of the CDMA receiver. Processing units request correlation operations by the shared correlator in which matched filter pseudo-noise (PN) vectors are correlated with the I and Q sample vectors $I_{REC}$ and $Q_{REC}$. The shared correlator schedules correlation operations requested by processing units, generates matched-filter, PN vectors with associated identification tags for the correlation operations, and provides correlation results for the correlation operations. Although the exemplary embodiments described below reference I and Q sample vectors, the present invention is not so limited, and may be used for a single channel or multiple channels.

Figure 2:
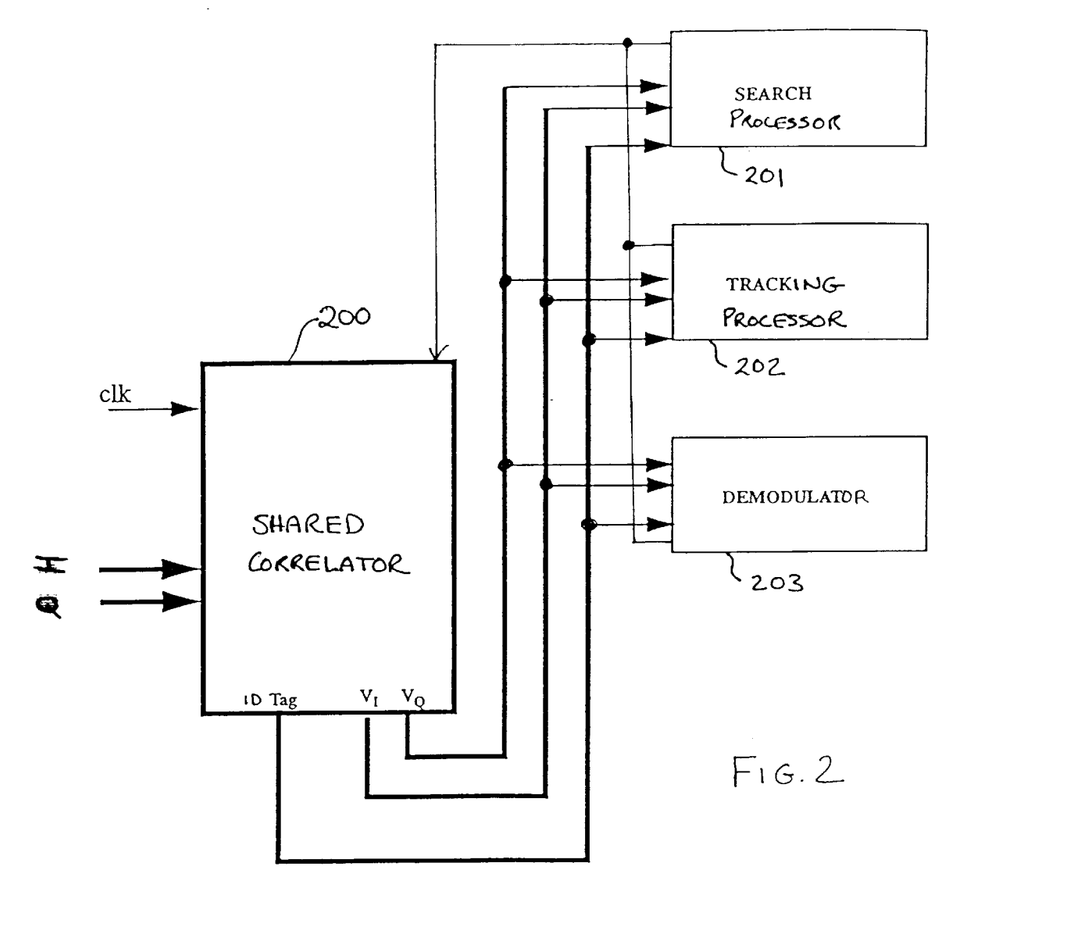
FIG. 2 shows an exemplary shared correlator in accordance with the present invention providing shared correlation operations for processing units of a CDMA receiver.

FIG. 2 shows an exemplary shared correlator 200 providing correlation operations for a search processor 201, tracking processor 202, and demodulator 203 of the CDMA receiver. Search processor 201, tracking processor 202, and demodulator 203 of the CDMA receiver may be processing units providing different functions of the CDMA receiver, and other types of processing units may similarly employ the shared correlator of the present invention. Each of the exemplary search processor 201, tracking processor 202, and demodulator 203 of the CDMA receiver are coupled to the shared correlator 200 by, for example, a shared bus. Each may request correlation operations and receive correlation results (i.e., $V_I$ and $V_Q$ of I and Q sample vectors $I_{REC}$ and $Q_{REC}$, respectively) through the shared bus.

The search processor 201 may be employed to search a received signal for a pilot code sequence of a base station. For this search, the shared correlator may repeatedly generate matched-filter PN vectors with offsets following a search technique, such as linear search (increasing or decreasing number of chips from a reference) or zig-zag search (alternatively increasing and decreasing the number of chips from a reference). For this search, offsets may typically be on the order of a single-chip width. Tracking processor 202 may be employed once synchronization with an embedded code sequence occurs. Tracking processor 202 may correlate several matched-filter PN vectors having relatively small code-phase offsets to identify and maintain correct synchronization with several strong multipath component signals. For this operation, matched-filter PN vectors having a small offset, on the order of a quarter-chip width, are generated and the code-phase offsets associated with the highest SNR (highest correlation) are used for despreading and combining of the received signal. Demodulator 203 may employ matched-filter PN vectors combined with user-channel vectors (i.e., Walsh code or long PN code vectors) for despreading of user channels to recover user or system data channels.

In accordance with the present invention, the shared correlator 200 employs pipeline processing techniques to facilitate sharing of correlation functions and results. Consequently, the correlation results $V_I$ and $V_Q$ each have an associated identification (ID) tag. A vector generator of the shared correlator 200 may generate and accumulate multiple-chip matched PN and sample vector pairs, and launch cross-correlation calculations for the pairs in parallel.

Using pipeline processing, or multiplexed correlation operations, the shared correlator may employ a single vector correlator circuit to accommodate the cross-correlation calculations in parallel. As shown in FIG. 2, each of the search processor 201, tracking processor 202, and demodulator 203 sharing the single data bus also receives ID tags associated with correlation results from the shared bus.

Pipeline processing is a technique known in the art of digital signal processing to enhance the bandwidth of shared execution units. Pipeline processing allows several hardware elements, or stages, to independently process portions of a computational task. Several processing units sharing the hardware elements may each have a computational task divided into parts corresponding to the hardware elements. Under separate control, the portions of the several computational tasks are scheduled for serial execution by each corresponding hardware element. By dividing the computational tasks for independent execution, the several processing units may have their computational tasks performed in parallel, while maintaining serial execution by each hardware element. This technique may be particularly effective when individual pipeline stages are independent of results being calculated in other stages, which condition frequently occurs in microprocessors operating as mathematical execution units.

To facilitate distribution of results to processing units in communication with a shared execution unit, a separate ID value, or tag, containing identifying information pertinent to the operation is associated with the results. The results and associated ID tag are distributed through the digital-processing pipeline. Since a search method of a RAKE receiver, for example, may tolerate latency when processing speeds are high, the present invention employs the pipeline processing technique with ID tags to expand multiplexing bandwidth of a single matched filter, or other type, of vector correlator.

For a shared correlator 200 of the present invention, several processing units, such as the search processor 201, tracking processor 202, and demodulator 203 of FIG. 2, may each request correlation operations. The shared correlator schedules each of these correlation operations for a vector correlator, or alternatively a small number (i.e., two or three) vector correlators, and may break each correlation operation into several sub-operations (i.e., for multiple offset search fingers, or correlation over several data symbols).

The shared correlator creates an ID tag list for the operations, determines matched-filter PN vectors for each operation, and associates an ID tag with both the sample vectors and matched-filter PN vectors. Consequently, each computational steps of a vector correlator may be concurrently shared with different correlation operations, and matched-filter PN vectors may be concurrently generated in a vector generator for other correlation operations during these computational steps.

In accordance with the present invention, an ID tag is associated with matched-filter PN vectors generated by the vector generator and correlation results of the vector correlator. These matched-filter PN vectors and correlation results may correspond to portions of a cross-correlation of a search finger of search processor 201, search finger of tracking processor 202, or demodulation by demodulator 202. The ID tag identifies, for example, PN code sequence and code-phase offset, type of operation (i.e., search, track or demodulate), position within the operation, and logical channel (i.e., pilot channel or data channel). Since vectors may have a length shorter than the length of a PN sequence, the ID tag may identify which portion of the PN sequence the correlation results correspond to. The ID tag is launched along with the corresponding matched-filter PN vectors into a vector correlator of the shared correlator 200.

The ID tag follows each operation on the vectors within pipeline processing stages, and may be used by processing units of the system by decoding a field of an ID tag to identify valid data on the shared bus for the processing unit. Since each element may receive several correlation results for an operation, the ID tag allows for storage of results to process each correlation step of portions of a search finger in correct order. The ID tag also allows for several processing units to use the same correlation results, thereby reducing the number of operations of the vector correlator.

Figure 3:
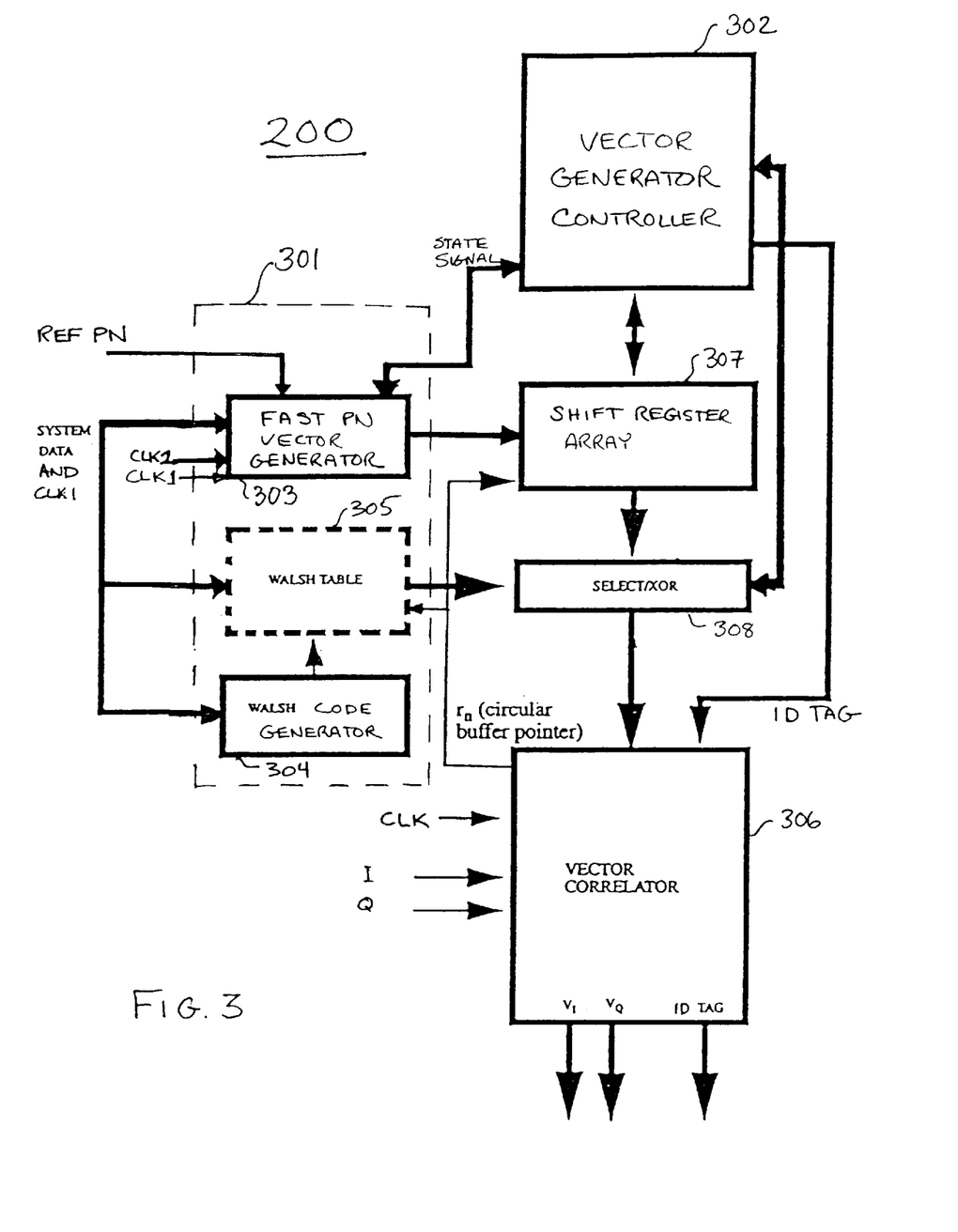
FIG. 3 shows an exemplary embodiment of the shared correlator shown in FIG. 2.

An exemplary embodiment of the shared correlator 200 employing pipeline processing with ID tags is shown in FIG. 3. The shared correlator 200 includes a vector generator module including vector generator 301 and vector generator controller 302. Vector generator 301 further includes fast PN vector generator 303 and Walsh code generator 304 with optional Walsh code table 305. The shared correlator also includes matched-filter vector correlator 306, shown with shift-register array 307 and select/XOR circuit 308.

The functions of the search processor 201, tracking processor 202 and demodulator 203 of the CDMA receiver are typically controlled by an external controller (not shown), such as a microprocessor. The vector generator controller 302 may be coupled to the external controller to receive requests for, and scheduling of, different correlation functions related to these operations for pipeline processing. However, the vector generator controller 302 may receive these requests directly from the processing units themselves. Also, the CDMA receiver may generate local reference PN code sequences REF PN and clock signal CLK for use by the vector generator 301 and vector correlator 306 in synchronizing vector code-phase offsets.

Vector generator controller 302 schedules correlation operations for vector correlator 306, and the vector generator controller maintains a list of ID tags for each matched-filter PN vector, or set of matched-filter PN vectors, generated by vector generator 301. Vector generator controller 302 provides various information as a state signal to the fast PN vector generator 303 specifying the particular matched-filter PN vectors to be generated and provided to the vector correlator 306. Vector generator 301 generates the specified vectors, as is described subsequently, and provides the matched filter PN vectors for storage in shift-register array 307.

When a scheduled correlation operation is desired, the vector generator controller 302 also signals the select/XOR circuit 308 to retrieve one or more desired matched-filter PN vectors from the shift-register array 307. Select/XOR circuit 308 includes selection circuitry to address and retrieve matched-filter PN vectors stored in the shift-register array 307. Select/XOR circuit 308 may include an exclusive-OR operator (XOR) to combine other vectors, such as Walsh code or long PN code vectors, with the matched-filter PN vector, such as may be required when demodulating a user data channel in an IS-95 system. The select/XOR circuit 308, in turn, provides the retrieved matched-filter PN vectors (I-seq and Q-seq) to the vector correlator 306 (FIG. 3) of a CDMA receiver from the shift-register array 304. The shift-register array 304 may also be a large array of, for example, 64-bit wide registers storing many different matched-filter PN vector entries generated by the vector generator 301. In this case, the select/XOR circuit 306 may require address logic to select and retrieve multiple shift-register array entries.

Vector generator controller 302 then provides the ID tag associated with the retrieved matched-filter vectors to the vector correlator 306. Vector correlator 306 implements the search finger as a detection of cross-correlation of the provided matched-filter PN vectors combined with the I and Q sample vectors, $I_{REC}$ and $Q_{REC}$. The correlation results, $V_I$ and $V_Q$, and the associated ID tag are subsequently provided to the shared bus by vector correlator 306. The vector correlator 306 desirably operates in a serial-multiplexed fashion.

For an exemplary embodiment of the present invention, matched-filter PN vectors may have a vector length of 64 chips (i.e., a 64 chip long sequence vector). This vector length may be, for example, a common vector length for an IS-95 system since a 64-chip period equals the period of a data symbol. Correlation results may desirably be performed on sample vectors $I_{REC}$ and $Q_{REC}$ formed from the received sequences I and Q on a symbol-by-symbol basis for each of the I and Q channels. Consequently, for this embodiment, shift-register array 307 may be a double 64-bit-wide shift register, or an array of shift registers, and the select/XOR circuit 308 may be a MUX. The XOR operator of the select/XOR circuit 308 may be employed, for example, if the matched filter PN vector is to be combined with a Walsh code vector provided by Walsh code generator 304, or by optional Walsh table 305, such as in IS-95 systems.

Figure 4:
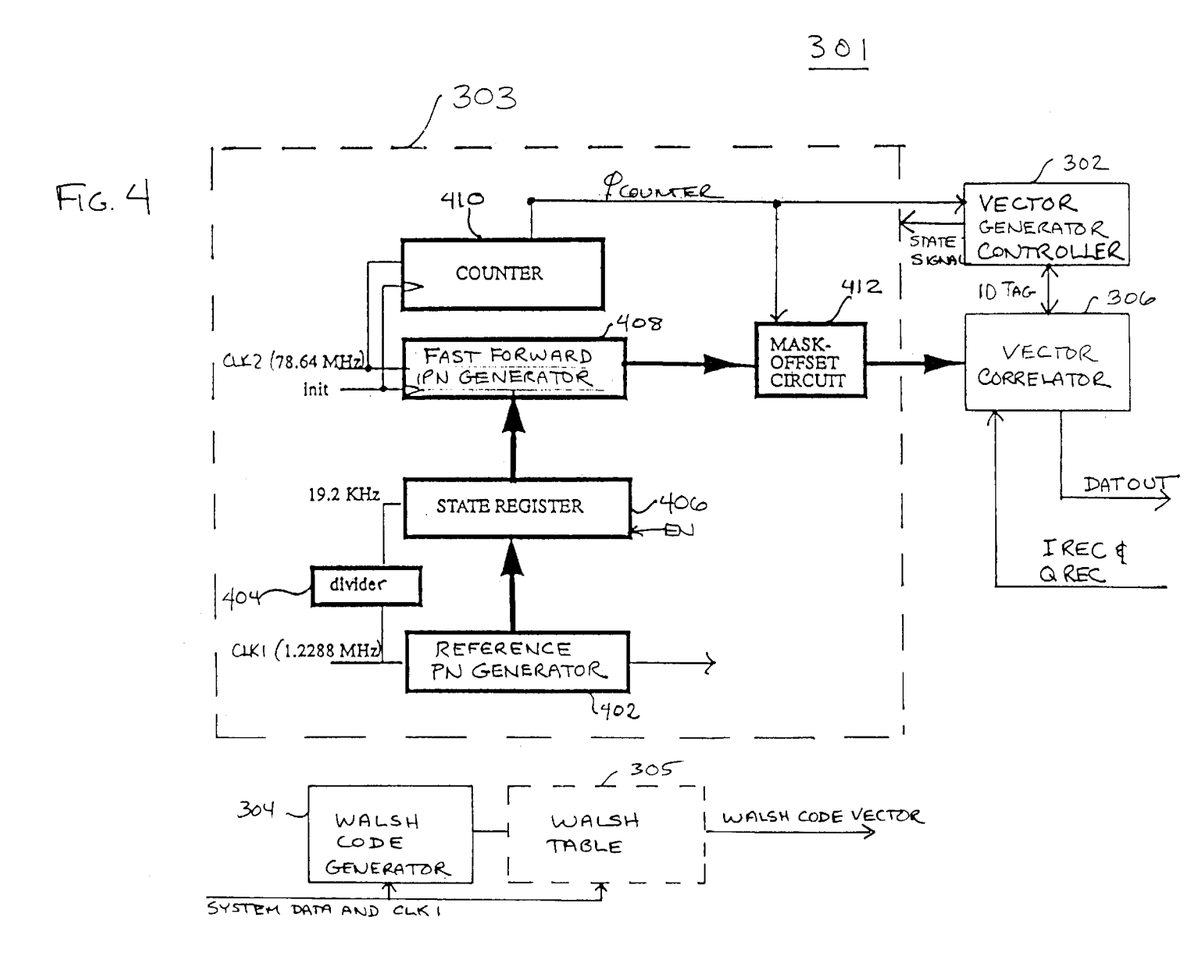
FIG. 4 shows an embodiment of a vector generator of the shared correlator in accordance with the present invention.

The vector generator 301 of FIG. 3 is shown in FIG. 4. The vector generator of the present invention generates the relatively large number of matched-filter PN vectors employed by the vector correlator 306 with code phase offsets specified by the vector generator controller 302. The PN vector generator 301 allows for high speed generation and multiplexing of multiple matched-filter PN vectors of arbitrary offsets. In addition, the vector generator may allow greater flexibility to generate non-symbol aligned matched-filter PN vectors to exploit correlator capacity in high-speed data and/or handoff situations.

Referring to FIG. 4, there is shown a vector generator 301 in accordance with an embodiment of the present invention. The vector generator controller 302 may have several options, or degrees of freedom, to generate the desired matched-filter PN vector with the vector generator 301. The vector generator 301 includes fast PN vector generator 303, Walsh code generator 304 and optional Walsh table 305. Fast PN vector generator 303 may employ both a set of masks and fast forwarding offset states of a local PN sequence. As shown in FIG. 4, the fast PN vector generator 303 includes a reference PN generator 402, a clock divider 404, a state register 406, a fast forward (FF) PN generator 408, optional counter 410 and mask-offset circuit 412. Reference PN generator 402 may locally generate any one of a number of reference PN sequences employed by the CDMA receiver (i.e., pilot, data or other system spreading codes, if different). The sequences of reference PN generator 402 may be synchronized to a reference PN signal REF PN employed by the CDMA receiver and at a clock rate CLK1.

Walsh code generator 304 may be employed to generate one or more Walsh codes having a given length. Techniques for generation of Walsh codes are well known in the art. However, a Walsh code vector may not necessarily be required. For example, the IS-95 system assigns a different Walsh code for user data, and system data, but assigns no Walsh code (or "zero" Walsh code) to the pilot signal. If the vector generator controller 302 schedules a pilot code search requested by search processor 201, then no Walsh code vectors are necessarily generated. However, if the vector generator controller 302 schedules a demodulation of a user data channel requested by demodulator 203, then the Walsh code generator would generate the specified Walsh code for the user. Further, Walsh code vectors having different code-phase offsets of a reference state Walsh code may be stored in Walsh code table 305. However, the Walsh code generator 304 may directly generate the Walsh code vectors with a specific Walsh code-phase offset without storing the Walsh code vectors in a table.

Reference PN generator 402 and FF PN generator 408 each generate PN code sequences as is known in the art and may be generated as described with reference to FIG. 1. Although the following describes vector generation with respect to a single local PN code sequence from reference PN generator 402, the present invention is not so limited. The PN code sequences for the I-channel and Q-channel may be the same PN code sequence with either the same or different code-phase offsets with respect to a reference. For systems such as IS-95, however, the PN code sequences for the I-channel and Q-channel may be different PN code sequences. For example, the reference and FF PN generators 402 and 408, respectively, may be duplicated to generate pairs of offset PN code sequences as matched-filter PN vector pairs for correlation with received values ($I_{REC}$ and $Q_{REC}$) of the I-channel and Q-channel.

State register 406 stores a reference state of the local PN code sequence generated by the reference PN generator 402. This local PN code sequence is a free running code with zero code-phase offset and the PN local code sequence is clocked at CLK1. The value for CLK1 may be, for example, 1.2288 mega-chips per second (Mcps) as is employed in IS-95 systems, and may be generated from the system clock CLK. The reference state of state register 406 is a particular state value within the local PN sequence that is contained in the shift register of reference PN generator 402. The particular reference state captured may be specified by the vector generator controller 302 and captured by the state register 406 via a clock transition and/or enabling signal EN. The EN signal may be part of the state signal generated by the vector generator controller 302, or may be a clock signal derived from the clock of either the reference PN generator 402 or the data symbol clock. As shown in FIG. 4, the clock signal CLK1 of the reference PN generator 402 may be divided by divider 404 to provide a divided clock signal for the state register 406. Also, a separate EN signal is shown that may enable or disable the capture of successive states on each divided clock transition.

FF PN generator 408 is loaded with the state of state register 406 and generates one or more fast-forward PN sequences. Each fast-forward sequence is an offset PN code sequence identical to the local PN code sequence, or a portion thereof, generated by reference PN generator 402 from the same reference state. However, FF PN generator 408 generates the offset PN code sequence with a clock signal CLK2 that may be a higher rate than that of the clock signal CLK1 and also derived from CLK.

FF PN generator 408 loads the reference state in accordance with an INIT signal that may be provided in the state signal from the vector generator controller 302. The offset PN code sequence may be the entire local PN code sequence, but is typically a portion of the local PN code sequence. The length of the offset PN sequence is determined by the period between successive INIT signals and the clock rate of the FF PN generator 408. The INIT signal may be used to repetitively generate the same sequence from one reference state if the EN signal does not update the value of the state register 406 with a successive reference state. The generation time of each matched-filter PN vector of this case may be 1-chip period in duration. Further, the INIT signal and EN signal may be employed together to generate a periodic sequence of offset PN code sequences by periodically selecting reference states with the EN signal, and generating particular sequences from each reference state with the INIT signal.

Typically, the state register 406 may be updated with either 1) the same reference state or a particular state determined by vector generator controller 302, or 2) successive reference states for each clock period of the data symbol clock, For example, as described previously, the clock signal CLK1 of the reference PN generator 402 at 1.2288 MHz may be divided by the number of chips in a data symbol, for example 64, to provide a divided clock signal of 19.2 KHz for the state register 406. This dividing of CLK1 may be employed such that correlations by the vector correlator 306 occur over a data symbol period. Also, the FF PN generator 408 may provide the offset PN sequence beginning with a specified time-delay with respect to the initial code phase of the reference state in state register 406. The time-delay may be provided by delaying the start of the FF PN generator 408 by either disabling the clock signal or by a separate EN signal. Consequently, this time-delay may not necessarily be aligned with either the clock signal CLK1 of the reference PN generator, divided clock of the PN generator or the symbol clock. Each offset PN code sequence, or a portion thereof, may form a matched-filter PN vector.

As described previously, the FF PN generator 408 may be clocked at a higher frequency than the clock of the local PN code sequence, which is of 1.2288 MHz for the exemplary IS-95 system. For example, the higher clock signal CLK2 having a rate of 78.864 MHz may clock the offset PN code sequence at 78.864 Mcps. With this higher clock rate, up to 64 offset PN code sequences may provided by the FF PN generator 408 during a period of the reference PN code sequence. The higher clock rate of the FF PN generator 408 combined with the ability to capture each reference state based on the symbol clock allows for generation of multiple offset PN code sequences, each having a different code-phase offset, in advance of the local PN sequence of reference PN generator 402.

The mask-offset circuit 412 combines particular mask values with the offset PN code sequences to provide matched-filter PN vectors that may be used to drive the vector correlator 306. For example, to generate a vector for correlation with embedded sequence with code-phase offset $\Phi_{off1}$, the mask value to generate the sequence with code-phase offset $\Phi_{off1}$ is combined with a given offset PN code sequence. If a second embedded sequence is present, to generate the sequence for correlation with offset $\Phi_{off2}$ the same reference state is used, but the mask corresponding to offset $\Phi_{off2}$ is applied. This example may correspond to a case where a receiver tracks two different pilot codes of two base stations in an IS-95 system. Each of the embedded sequences may have a known code-phase offset when compared to the first embedded sequence, so a single offset PN code sequence is generated, and each matched-filter PN vector for the two pilot code correlations is generated with respective mask values.

Figure 5:
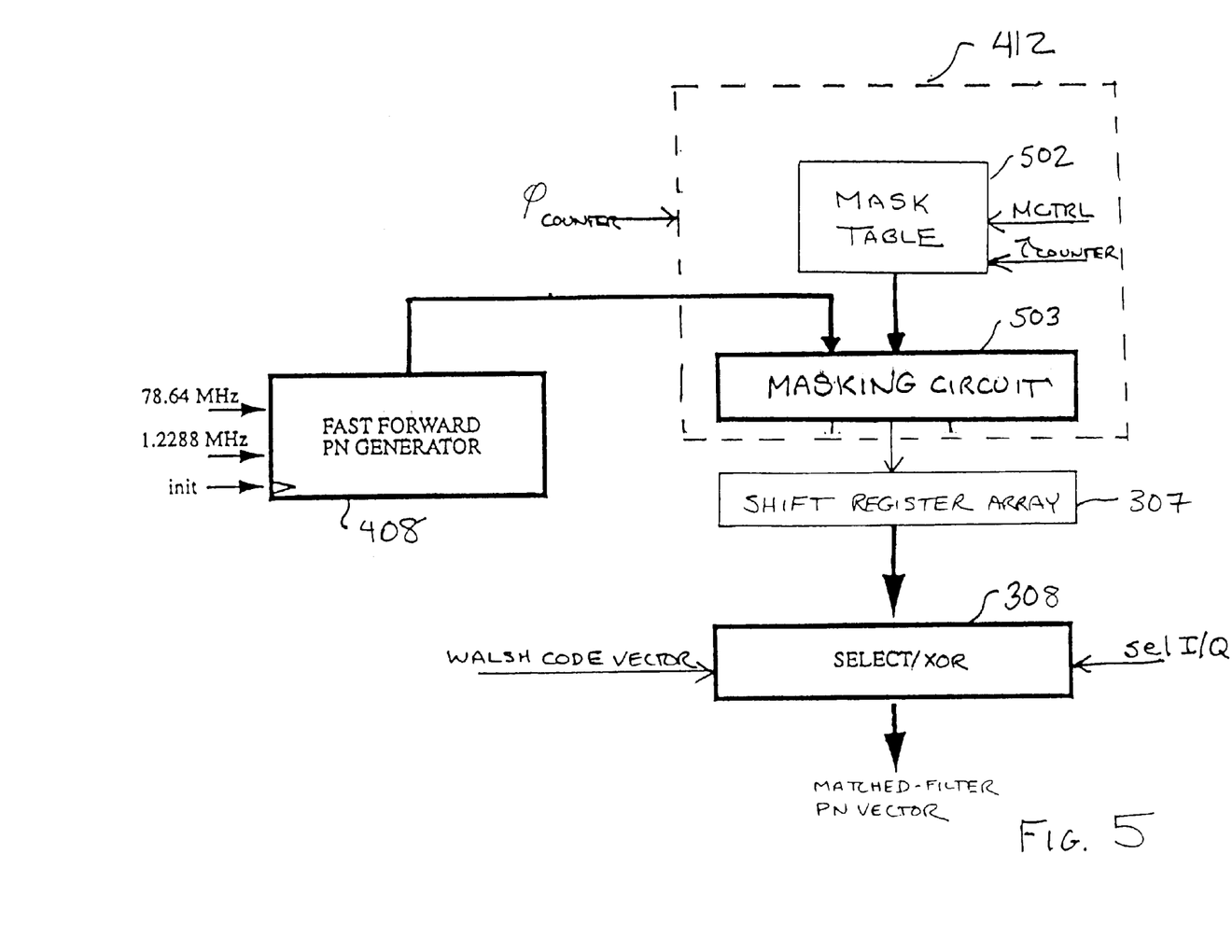
FIG. 5 shows an embodiment of the mask-offset circuit of the vector generator of FIG. 4.

FIG. 5 is a block diagram showing an embodiment of the mask-offset circuit 412. FIG. 5 also shows the FF PN generator 408 operating as described previously to provide multiple versions of the local PN code sequence to the mask-offset circuit 412. The mask-offset circuit 412 includes mask table 502, and masking circuit 503. Shift-register array 307 and select circuit 308 (FIG. 3) are also shown.

FF PN generator 408 may generate the offset PN code sequences as matched-filter PN vectors (I-seq and Q-seq) for correlation with both sample vectors $I_{REC}$ and $Q_{REC}$. As described previously, the counter 410 may also provide a counter offset value. The mask-offset circuit 412 includes the mask table 502 from which values of masks are selected based on at least one of i) a control signal, MCTRL, from vector generator controller 302, and ii) the counter offset value $\phi_{counter}$. These mask values are then provided to the masking circuit 503, which combines these mask values with the offset PN code sequence to form matched-filter PN vectors. The masking circuit 503 may either receive the entire offset PN code sequence or successive states of the FF PN generator 408. The matched-filter PN vectors of masking circuit 503 are then stored in shift-register array 307.

Figure 6:
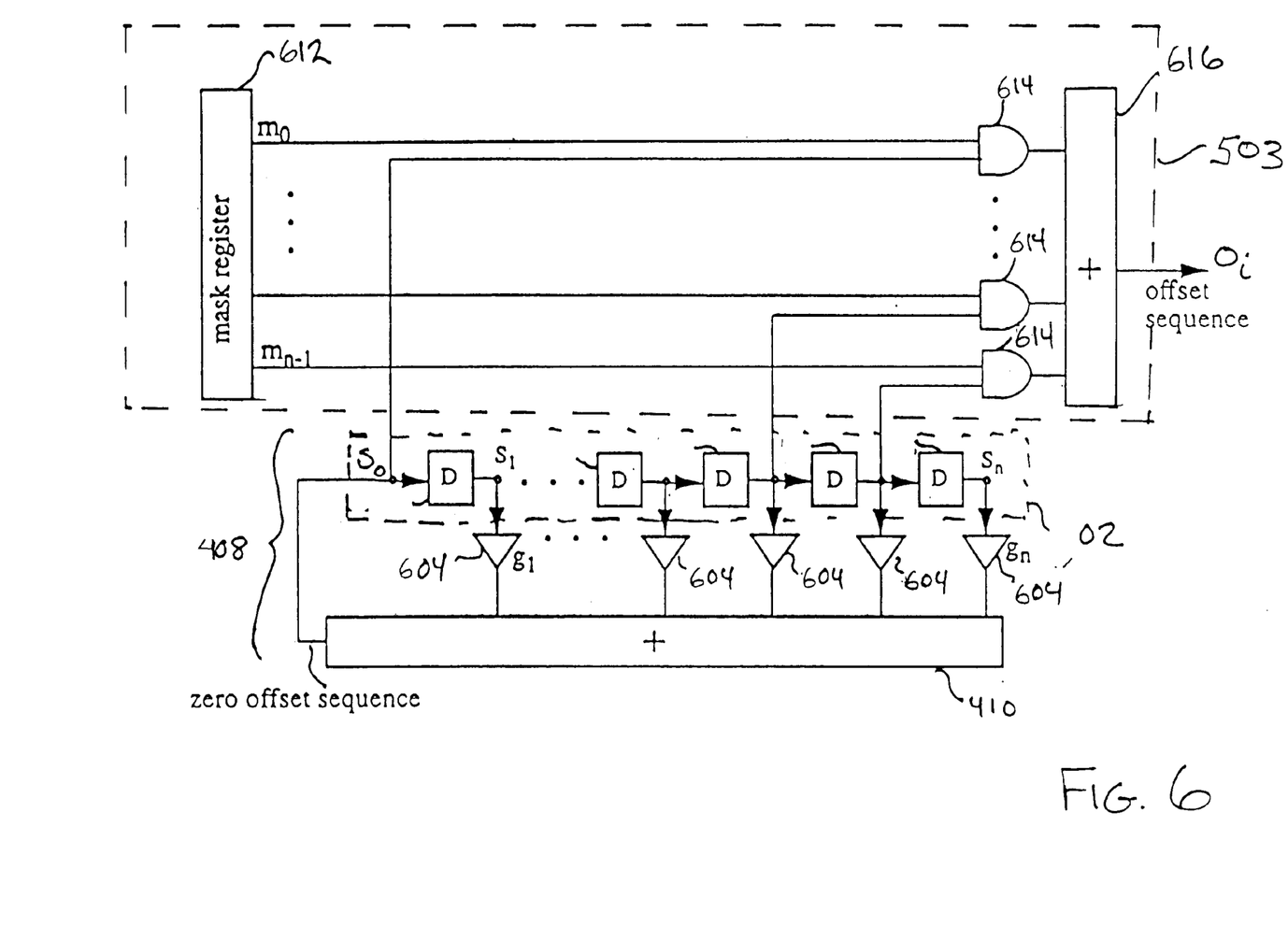
FIG. 6 shows a masking circuit of the mask-offset circuit of FIG. 5.

Referring to FIG. 6, there is shown a masking circuit 503 employed to generate matched-filter vectors from an offset PN code sequence provided from FF PN generator 408. As illustrated, the masking circuit 503 generates matched-filter vectors from successive states of the FF PN generator 408. Also, the FF PN generator 408 as shown in FIG. 6 may include shift register 602 having n stages, n an integer greater than 0, gain amplifiers 604, and modulo-2 adder 610. The masking circuit 503 includes a mask register 612, which receives mask values $M=m_{[n-1:0]}$ from the mask table 502 (FIG. 5), combiners 514 that may be AND gates, and modulo-2 adder 616. Gain amplifiers 604 have values $g_{[n:0]}$, which are polynomial coefficients of the PN generating polynomial G. Also, the values of the stages in shift register 602 is $S=s_{[n:1]}$, and the mask value in mask register 612 is $M=m_{[n-1:0]}$.

Shift register 602 is loaded with a reference state as described with respect to FIG. 4. Then, for each clock cycle, the values $S=s_{[n:1]}$ of the shift register stages are multiplied by polynomial coefficients $g_{[n:1]}$ via gain amplifiers 604 and combined in modulo-2 adder 610 to provide new value so. This is a cyclic process. The value $s_0$ in modulo-2 adder 610 is then applied to the first element of the shift register 602 and the last element $S_n$ is discarded. For each state of the shift register 602, a chip of a new state may be provided which corresponds to a value of the PN sequence shifted by an offset delay. Combining a state of shift register 102 with a corresponding mask value stored in mask register 612 generates this chip of the new state. The mask values $M=m_{[n-1:0]}$ are combined with the state of shift register 602 by combiners 614. The combined mask and register stage values are then modulo-2 added by adder 616 to provide the chip value $o_i$ of the offset sequence $O_{[n:1]}$.

Some systems, such as IS-95, may insert an extra value in the PN code sequence so that the PN code sequence is a multiple of 2. Additional logic may be required to insert the extra value into each sequence following 14 consecutive 1's or 0's. Additional logic for correcting the masked sequence may also be employed.

One alternative implementation of the mask-offset circuit 412 of FIG. 4 may include a sequence counter and a read-only memory (ROM). The ROM stores the PN sequence, and the sequence counter employs the mask value and the current counter value $\phi_{counter}$ to select the point in the stored sequence of the ROM to begin reading values. Another alternative implementation of the mask-offset circuit 412 of FIG. 4 may simply be as a large table of matched-filter vectors stored in, for example, ROM. A reference state of the reference PN generator, a mask value and/or a counter value may then be employed by a memory address processing module to select a desired matched-filter PN vector from memory. Efficient memory storage structures, such as a trie structure, may be employed to decrease search time of the table.

Returning to FIG. 3, as described previously, vector generator controller 302 provides signals to the fast PN vector generator 303 specifying the particular matched-filter PN vectors to be generated and provided to the vector correlator 306. Since vector generator controller 302 schedules correlation operations for vector correlator 306, the vector generator controller 302 also associates ID tags for each matched-filter PN vector, or set of matched-filter PN vectors, generated.

In addition, vector generator 301 allows the vector generator controller 302 to form vector generation requests by the state signal with multiple degrees of freedom for specific matched-filter PN vectors. The vector generator controller 302 employs these degrees of freedom to generate matched-filter PN vectors when scheduling correlation operations and associating ID tags with generated matched-filter PN vectors. For example, some operations may use the same matched-filter PN vectors, one matched-filter PN vector multiple times, completely different matched-filter PN vectors, or a set of matched-filter PN vectors with fixed relative code-phase offsets. The order in which these matched-filter vectors may be generated, or the sequence of correlation operations, may be determined by the relationship between the different required matched-filter PN vectors and/or the sample vectors $I_{REC}$ and $Q_{REC}$.

Vector generator controller 302 employs a scheduling algorithm specifying matched-filter PN vectors with the multiple degrees of freedom defined as follows. Each successive state of reference PN generator 402 is defined with state number $\lambda_L(t)$ having units as number of chips forward (or reverse) of an arbitrary zero code-phase state of the local PN code sequence (i.e., pilot code rollover, for IS-95). Each state of FF PN generator 408 is defined with state number $\lambda_F$ having units as number of chips forward (or reverse) of the captured reference state of the local PN code sequence (i.e., local state vector). Each state is defined at a period time, and may change with time in accordance with sequence generation since clock rates of the PN sequence generators may be different. For the mask offset circuit 412, the masked sequence code-phase offset of the mask value is defined as $\Delta_M$ in number of chips. Offsets, which may be defined as the difference between states, are fixed values and may be less than a chip width. Mask offsets, however, are of an integer number of chips.

A new state $\lambda_N(t)$ at, for example, $t=t_1$ may be employed to generate a PN sequence as a matched-filter PN vector, and is defined as in equation (3):

$$\lambda_N(t_1)=\lambda_L(t_1)+\lambda_F(t_1)+\Delta_M \quad (3)$$

The matched-filter PN vector is a sequence that may be a portion of the sequence generated from this new state $\lambda_N(t)$, the portion being of length R chips (i.e., R an integer typically the length of a register). Further, a delay $\tau_{cr}$ may occur between the point in time ($t=t_1$) of generation of the matched-filter PN vector generated for a target state $\lambda_T(t)$ and the point in time $t=t_1+\tau_{cr}$ when the matched-filter PN vector is compared to the target vector. This time delay $\tau_{cr}$ requires an additional offset factor $\Phi_{\tau cr}$ (number of chips of the time delay between reference state capture and comparison time) to be considered. Therefore, the matched-filter vector has an offset $\Phi(t=t_1+\tau_{cr})$ as given in equation (4)

$$\Phi(t=t_1+\tau_{cr})=\lambda_T(t_1+\tau_{cr})-\lambda_N(t_1)-\Phi_{\tau cr} \quad (4)$$

Combining equation (1) and equation (2), the vector generator 200 provides the matched-filter PN vector from a new state with an offset $\Phi_{VEC}$ related to the target vector state $\lambda_T$ as given in equation (5):

$$\Phi_{VEC}=\lambda_T(t_1+\tau_{cr})-\lambda_L(t_1)-\lambda_F(t_1)-\Delta_M-\Phi_{\tau cr}) \quad (5)$$

Thus, vector generator 301 in accordance with the present invention allows for four degrees of freedom to provide the matched-filter PN vector, or offset reference sequence fragment, for comparison with the target vector.

In one exemplary embodiment, in response to signals from vector generator controller 302, the state register 406 (FIG. 4) captures successive reference states of the local PN code sequence every data symbol period (i.e., a 64-chip period). The clock rate of the FF PN generator 408 is 64 times higher than the clock rate of the reference PN generator 402. The FF PN generator 408 then advances 64 clock periods for each clock cycle of the local PN code sequence of the reference PN generator 402 to generate an offset PN code sequence of, for example, 64 chips, for each reference state. Then, the divided clock rate of the reference PN generator 402 allows the vector generator 301 to cycle through each of the possible offset reference state numbers. The vector generator 301 captures in state register 406, and loads into the FF PN generator 208, each successive reference state of the shift register of reference PN generator 402 in response to the INIT and EN signals of vector generator controller 302.

For the exemplary embodiment, within the period of the local PN code sequence at 1.2288 MHz up to 64 different offset PN code sequences are generated, each with a corresponding code-phase offset from the initial state of the reference local PN code sequence. Each code-phase offset may be equivalent to a single chip, multiple chips based on the delay enabling the clock of FF generator 408, or an integer multiple of 64-chips based on capture of successive states. Each offset PN code sequence, or a portion thereof, either forms a matched-filter PN vector, or is used in combination with a mask value to form a matched-filter PN vector. Counter 210 clocked with the 78.864 MHz clock may be employed to give a counter value $\phi_{counter}$ corresponding to the code-phase offset of each offset PN code sequence defined as a matched-filter PN vector. The counter value may also be used by the vector generator controller 302 to select particular mask values to produce corresponding offset sequences of the PN code sequence.

The counter value may be offset by a predetermined number if, for example, multiple pilot codes are tracked. Since the code-phase offsets between base stations may be known, such as the case with IS-95, the counter may be employed by the vector generator controller 302 as a reference for the currently tracked pilot code and pilot codes of surrounding base stations.

To generate a matched-filter PN vector for correlation with embedded sequence having offset $\Phi_{off1}$ corresponding to time-delay $\tau_{off1}$, a mask value for offset $\Delta_{M1}$ to generate the offset PN code sequence with offset $\Phi_{off1}$ is used. The masked sequence generates a vector aligned with the arriving 64 bits of the embedded sequence, and is launched at time delay $\tau_{cr1}$. To generate the sequence for correlation with offset $\Phi_{off2}$ corresponding to time-delay $\tau_{off2}$, the same reference state $\lambda_L$ is used, but the mask value for offset $\Delta_{M2}$ is applied. The shift register contents are overwritten with the new matched-filter PN vector, which is applied at time delay $\tau_{cr2}$.

Figure 7:
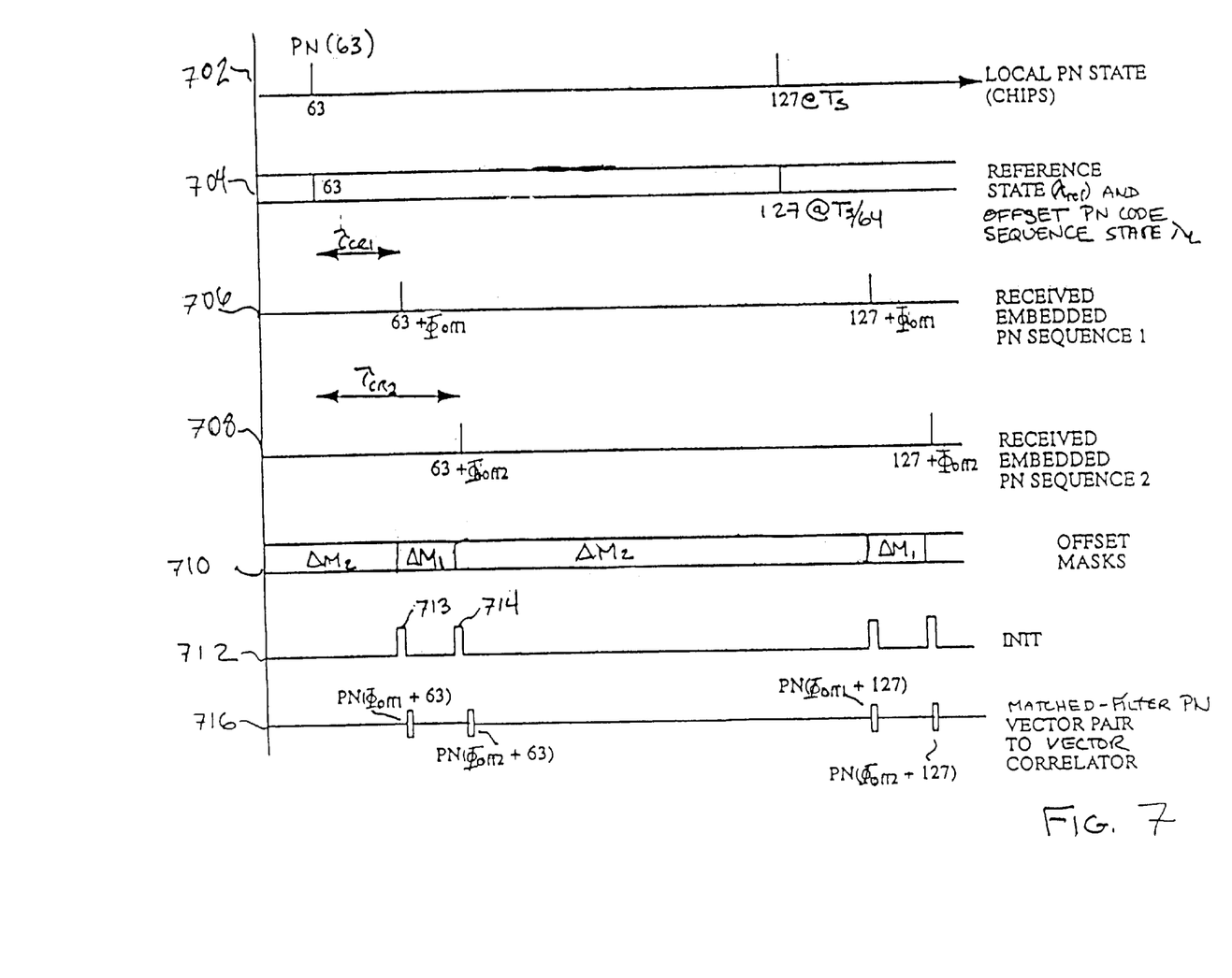
FIG. 7 illustrates a timing diagram of the embodiment of the vector generator.

FIG. 7 illustrates a timing diagram of the vector generator 301 in accordance with the exemplary embodiment of the present invention. As shown on 702 in FIG. 7, during a symbol period $T_s$ the reference PN generator 402 provides chip values corresponding to the local PN code sequence values 63 through value 127. Consequently, 704 shows the first 15 values (63 through 77) of the local PN code sequence are stored as the reference state in the state register 406 (assuming a 15-stage, linear-feedback shift register is employed by the reference and FF PN generators 402 and 408, respectively). In addition, the chip values corresponding to the local PN code sequence values 63 through value 127 form the offset PN code sequence, but with period ($T_s/64$). First and second embedded PN sequences are received and are shown on 706 and 708, respectively. As shown the first PN sequence has an offset of $\Phi_{off1}$ and the second embedded PN sequence has a offset of $\Phi_{off2}$ from the chip value 63. Each offset $\Phi_{off1}$ and $\Phi_{off2}$ may correspond to a PN sequence of a different base station.

First and second mask values $\Delta_{M1}$ and $\Delta_{M2}$ are retrieved as shown on 710. The timing for the INIT signal provided to the FF PN generator is shown on 712. Successive transitions of INIT at 713 and 714, respectively, generate two, 64-bit offset sequences equivalent to the offset PN code sequence of 704. As shown in FIG. 7, the retrieval of the first and second mask values $\Delta_{M1}$ and $\Delta_{M2}$ may occur concurrently with generation of the two, 64-bit PN code sequences from state number $\lambda_L$, but such timing may not be necessary. Finally, mask-offset circuit 412 combines the mask values and offset PN code sequences as shown on 716 to form the matched-filter PN vector pair.

FIG. 7 shows the matched-filter vector pair generated nearly synchronized with the embedded PN sequences of 706 and 708 (i.e., launched at time delay $\tau_{cr1}$ and $\tau_{cr2}$), but this may not necessarily occur. However, the vector generator 301 may generate several matched-filter vector pairs as shown in FIG. 7, with each pair launched at a different time delay $\tau_{crn}$. Each time delay $\tau_{crn}$ may result in each pair being separated in code phase by either a chip-width or a fraction of a chip-width. Consequently the FF PN generator 408 cycles through all of the possible values of the PN sequence given the known code-phase offsets and various time-delays.

Figure 8:
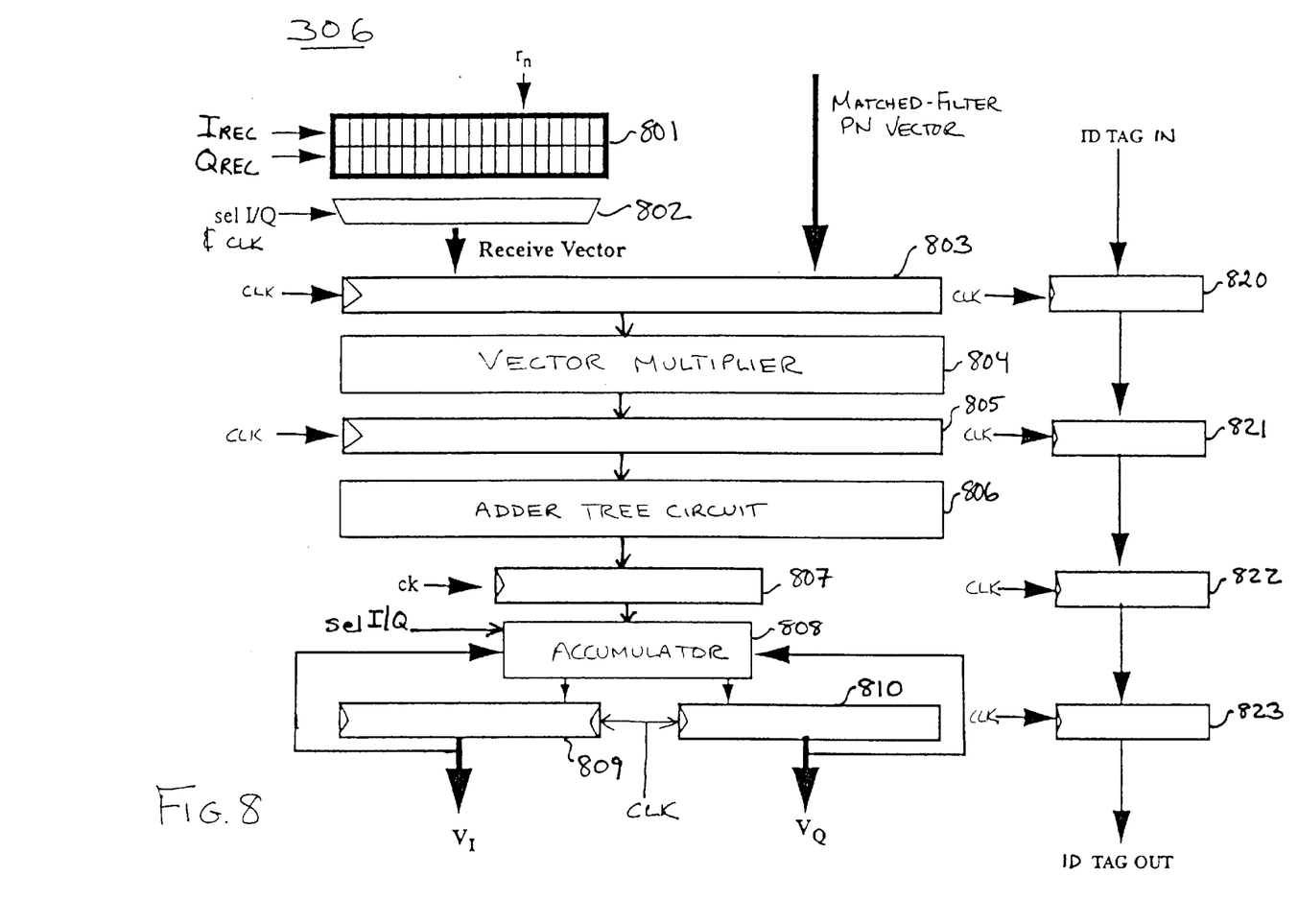
FIG. 8 shows an embodiment of the vector correlator of the shared correlator employing pipeline processing and associated identification tags in accordance with the present invention.

FIG. 8 shows an embodiment of the vector correlator 306 of the shared correlator 200 employing ID tags and pipeline processing in accordance with the present invention. Vector correlator 306 comprises receive buffer 801, MUX 802, vector register 803, vector multiplier 804, multiplier register 805, adder tree circuit 806 and adder register 807. Vector correlator 306 further includes ID tag registers 820–823 and accumulate circuit having accumulator 808 and registers 809 and 810 for storing the I and Q correlation results $V_I$ and $V_Q$, respectively. ID tag registers 820–823 may each be associated with specific clocking of results from operations on vectors by vector register 803, vector multiplier 804 and multiplier register 805, and adder tree circuit 806 and adder register 807, respectively.

Portions of the received sequences I and Q are stored in receiver buffer 801 as sample vectors $I_{REC}$ and $Q_{REC}$. Receiver buffer 801 includes a circular pointer $r_n$. The receive buffer circular pointer rn tracks a beginning of the received sample sequence. In accordance with the Sel I/Q signal, MUX 802 selects one of the current sample vectors $I_{REC}$ or $Q_{REC}$ as an output vector. The Sel I/Q signal may be provided by either an external controller or the vector generator controller 302 to select either an I or Q correlation operation. Upon a first transition of the correlator clock signal CLK, the selected one of the current sample vectors IREC or QREC from MUX 802 is loaded into the vector register 803. With the same transition of the clock signal CLK, the matched-filter PN vector and corresponding ID tag are also provided to the vector register 803 and ID tag register 820, respectively. The matched-filter PN vector may be pre-shifted by the value of the receive buffer circular pointer so as to align the matched-filter PN vector with the current sample vector in a desired manner.

With the next (second) transition of the clock signal CLK, the individual bits of the matched-filter PN vector and current sample vector are bit-multiplied in vector multiplier 804 and stored in multiplier register 805. Concurrently, the ID tag associated with the matched-filter PN vector and current sample vector is clocked into ID tag register 821. As would be apparent to one skilled in the art, during the second transition the Sel I/Q signal may change state. The next matched-filter PN vector and next sample vector pair with the associated ID tag may be loaded into vector register 803 and ID tag register 820 for the next stage of the pipeline processing.

With the third transition of the clock signal CLK, the bits stored in the multiplier register 805 are added together in adder tree circuit 806 and the result stored in the adder register 307. Also, the third transition causes the ID tag to be loaded into the corresponding ID tag register 822. The third transition also causes the next operation (bit-wise multiplication) for the following pair of vectors stored in vector register 803. During the third transition, the Sel I/Q signal may again change state. Also, for the third stage of pipeline processing, the next pair of vectors with associated ID tag may be loaded into vector register 803 and ID tag register 820, respectively.

The accumulator circuit may be employed to accumulate correlation results over multiple sample vectors. For the configuration shown in FIG. 8, the correlation results are accumulated for each of the I and Q channels. Based on the Sel I/Q signal and the fourth transition of the clock signal CLK, the result stored in adder register 307 is added by accumulator 808 to the previous accumulated result stored in register 809 or register 810 for the corresponding channel. The result is then stored over the previous accumulated result in register 809 or register 810 as the current correlation result $V_I$ or $V_Q$. The associated ID tag also clocked into the ID tag register 823 with the fourth transition. Consequently, correlation result $V_I$ or $V_Q$ and the associated ID tag are provided to the shared bus (FIG. 2) for use by, for example, the search processor 201, tracking processor 202 or demodulator 203.

For one embodiment of the present invention, the shared correlator employs pipelining to calculate the four real correlations of a complex correlation, as given in equations (1) and (2). The vector correlator 306 of FIG. 8 performs multiple correlations against successive sample vectors in accordance with the Sel I/Q signal, with MUX 802 selecting one of the current sample vectors $I_{REC}$ or $Q_{REC}$ as an output vector for the real correaltion. The Sel I/Q signal may be provided by either an external controller or the vector generator controller 302 to select either an I or Q correlation operation. Each real correlation result is then stored by the accumulator circuit to accumulate the four correlation results as the complex correlation result.

As shown and described, the vector correlator 306 of FIG. 8 performs multiple correlations against successive sample vectors. However, the present invention is not so limited to this order. Since pipeline processing is employed, if a different type of scheduled correlation operation is required by vector generator controller 302, the values of the receive buffer 801, vector register 803, multiplier register 805, adder register 807, ID tag registers 820–823 and accumulate circuit registers 809 and 810 may be stored. Then new or previously calculated values corresponding to correlation operations for another set of receive sample vectors, matched-filter PN vectors, and/or ID tags may be loaded for the next transition of clock CLK.

For the configuration of FIG. 8, the Walsh code generator 304 (FIG. 3) may provide Walsh code vectors that the vector generator 301 combines with matched-filter PN vectors in the select/XOR circuit 308. The receive buffer circular pointer $r_n$ may be aligned with the combined Walsh code and matched-filter PN vector. This alignment may be accomplished by, for example, a programmable barrel shifter receiving the matched-filter PN vector of select circuit 308 of the vector generator 301 and the vector register 803 of the vector correlator 306.

Alternatively, the alignment may be accomplished by aligning the Walsh code vector, the matched-filter PN vector, and the receive buffer circular pointer separately prior to combination. Since the Walsh vectors are fixed code sequences, a simple barrel shift register containing the Walsh code vector aligned to the receive buffer pointer $r_n$ may be employed. For the matched-filter PN vector, one or a combination of the following may be employed: 1) a simple barrel shift register; 2) a first-in, first-out (FIFO) register with write address aligned with $r_n$; and 3) a register which may operate as either a barrel shift register or a FIFO register.

A shared correlator in accordance with the present invention may receive and schedule multiple correlation requests, generate multiple-chip reference and data vectors, and launch cross-correlation calculations in parallel. Using pipeline processing or multiplexed serial correlation operations, the shared correlator may employ a single vector correlator circuit to accommodate a large number of correlation operations in parallel. The shared correlator of the present invention generates the corresponding large number of matched-filter PN vectors with code phase offsets and associates an ID tag with the vectors to facilitate multiplexed serial-correlation and sharing of correlation results. The shared correlator of the present invention may allow a design trade-off opportunity to reduce the number of vector correlator circuits and/or matched-filter PN vector storage registers required by, for example, a RAKE receiver while adding vector generator control scheduling operations. The reduction may result in reduced integrated circuit complexity and area. In addition, the shared correlator allows greater flexibility to generate multiple, non-symbol aligned, matched-filter PN vectors to exploit correlator capacity in high-speed data and/or handoff situations.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A correlator for generating CDMA correlation results for two or more different cross-correlation operations, the correlator comprising:

one or more processing units, each processing unit adapted to 1) perform a cross-correlation operation and 2) generate a CDMA correlation result and a corresponding ID tag from a corresponding sample vector of a CDMA signal; and a vector generator controller adapted to, for each cross-correlation operation, select one or more CDMA correlation results based on the corresponding ID tags.

2. The invention as recited in claim 1, wherein the vector generator controller is adapted to generate, based on each cross correlation operation, the ID tag and a state signal corresponding to at least one matched-filter PN vector; and wherein the correlator comprises:

a vector generator adapted to generate the at least one matched-filter PN vector based on the state signal; and a vector correlator adapted to generate the CDMA correlation result from a vector pair, the vector pair including one matched-filter PN vector and the sample vector, the vector correlator associating the ID tag with the CDMA correlation result.

3. The invention as recited in claim 2, wherein the vector correlator comprises:

a bit-multiplier adapted to receive the vector pair and to combine each bit of the sample vector with a corresponding bit of the matched-filter PN vector to form a correlated vector, the bit-multiplier having a corresponding ID tag register adapted to store the corresponding ID tag of the vector pair as a correlated vector ID tag;

an adder-tree circuit adapted to receive the correlated vector and to combine each bit of the correlated vector to provide a correlation value, the adder-tree circuit having a corresponding ID tag register adapted to store the correlated vector ID tag as a correlation value ID tag, and the correlation value and the correlation value ID tag of the adder-tree circuit ID tag register are provided as the CDMA correlation result and the associated ID tag.

4. The invention as recited in claim 3, further comprising an accumulator adapted to store the CDMA correlation result and having a corresponding ID tag register, and wherein:

the bit-multiplier is adapted to sequentially receive each vector pair having the corresponding ID tag;

the adder-tree circuit is adapted to sequentially provide the correlation value to the accumulator and correlation value ID tag of the adder-tree circuit ID tag register to the accumulator ID tag register, and wherein the accumulator is adapted to combine each sequentially provided correlation value with a previous CDMA correlation result of the accumulator to form the CDMA correlation result and to provide the ID tag of the accumulator ID tag register as the ID tag associated with the CDMA correlation result.

5. The invention as recited in claim 3, wherein the vector correlator further comprises a buffer adapted to store the sample vector with a circular pointer, the sample vector and each matched-filter PN vector aligned based on the circular pointer.

6. The invention as recited in claim 2, wherein the vector generator generates the at least one matched-filter PN vector from a reference PN sequence, the reference PN sequence having an initial state and a first clock rate, the vector generator comprising:

a register adapted to capture an initial state of the reference PN sequence; and a fast-forward PN generator adapted to generate at least one fast-forward PN sequence from the captured initial state, the fast-forward PN sequence having chip values equivalent to chip values of the reference PN sequence and the fast-forward PN generator providing the fast-forward PN sequence having a second clock rate greater than the first clock rate, wherein each matched-filter PN vector corresponds to one fast-forward PN sequence having a corresponding code-phase offset when compared to the code phase of the reference PN sequence.

7. The invention as recited in claim 6, wherein the register captures one or more successive states of the reference PN sequence based on the state signal; and the fast-forward PN generator generates at least one fast-forward PN sequence from each successive state.

8. The invention as recited in claim 6, further comprising a counter adapted to form a counter value corresponding to each code-phase based on the initial state and the second clock rate of the fast-forward PN sequence, and wherein the vector generator controller generates the state signal further based on the counter value.

9. The invention as recited in claim 6, further comprising a mask-offset circuit, the mask offset circuit adapted to apply at least one mask vector to the fast-forward PN sequence based on the state signal to form the matched-filter vector, the corresponding code-phase offset of the matched-filter vector determined by the mask vector.

10. The invention as recited in claim 2, wherein the vector generator controller generates the state signal identifying at least one Walsh code, and the vector generator further comprises a Walsh code generator, the Walsh code generator providing each Walsh code vector based upon the identified Walsh code of the state signal.

11. The invention as recited in claim 10, wherein the vector correlator provides a circular pointer of a buffer, the buffer adapted to store each sample vector, and the vector generator is further adapted to align each Walsh code vector, matched-filter PN vector and the sample vector based on the circular pointer.

12. The invention as recited in claim 10, wherein the vector generator further comprises a memory adapted to store a Walsh table, and the Walsh code generator generates a plurality of Walsh code vectors, each of the plurality of Walsh code vectors being stored as a corresponding entry of the Walsh table.

13. The invention as recited in claim 1, wherein:
the one or more processing units are one or more of a search processor, tracking processor and demodulator, and
the correlator is coupled to each processing unit by a shared bus, the ID tag identifies a corresponding processing unit, and each processing unit receives the correlation result from the shared bus based on the corresponding ID tag associated with the correlation result.

14. The invention as recited in claim 1, wherein:
the correlator is coupled to one or more processing units, the shared correlator employing pipelining for multiplexed correlations based on each correlation result and the corresponding ID tag associated with the correlation result.

15. The invention as recited in claim 14, wherein each different cross-correlation operation is performed with at least one matched-filter PN vector, and each of the multiplexed correlations is a vector cross-correlation operation with the sample vector.

16. The invention as recited in claim 15, wherein each processing unit employs a set of the different cross-correlation operations for a single complex cross-correlation operation with at least one sample vector.

17. A method of generating CDMA correlation results for two or more different cross-correlation operations performed by one or more processing units, comprising the steps of:
a) generating a CDMA correlation result from each sample vector of a CDMA signal; and
b) associating a corresponding ID tag with CDMA correlation result, each cross-correlation operation selecting one or more CDMA correlation results based on the corresponding ID tags.

18. The method as recited in claim 17, wherein step a) comprises the steps of:
a1) generating, based on each cross correlation operation, the ID tag and a state signal corresponding to at least one matched-filter PN vector;
a2) providing the at least one matched-filter PN vector based on the state signal; and
a3) correlating a vector pair, the vector pair including one matched-filter PN vector and the sample vector to generate the CDMA correlation result from a vector pair.

19. The method as recited in claim 18, wherein the step a3) comprises the steps of:
i) combining, with a bit-multiplier, each bit of the sample vector with a corresponding bit of the matched-filter PN vector of the vector pair to form a correlated vector;
ii) storing, in an ID tag register associated with the step i), the ID tag corresponding to the correlated vector;
iii) combining each bit of the correlated vector to provide a correlation value;
iv) storing, in an ID tag register associated with the step iii), the ID tag corresponding to the correlation value; and
v) providing the correlation value and the corresponding stored ID tag as the CDMA correlation result and the associated ID tag.

20. The method as recited in claim 19, wherein step a3) further comprises the steps of:
vi) repeating steps a3i) through a3iv) to provide a sequence of correlation values;
vii) accumulating each of the sequence of correlation values to form the CDMA correlation result, and the stored ID tag corresponding to the last of the sequence of correlation values being provided as the associated ID tag.

21. The method as recited in claim 19, further comprising the step of aligning, in code-phase, the sample vector and matched-filter PN vector of each vector pair.

22. The method as recited in claim 18, wherein the step a2) provides the at least one matched-filter PN vector from a reference PN sequence, the reference PN sequence having an initial state and a first clock rate, and the step a2) comprises the steps of:
i) capturing an initial state of the reference PN sequence based on the state signal;
ii) generating at least one fast-forward PN sequence from the captured initial state, the fast-forward PN sequence having chip values equivalent to chip values of the reference PN sequence; and
iii) providing the fast-forward PN sequence having a second clock rate greater than the first clock rate, wherein each matched-filter PN vector corresponds to one fast-forward PN sequence having a corresponding code-phase offset when compared to the code phase of the reference PN sequence.

23. The method as recited in claim 22, wherein the steps a2i) through a2iii) are repeated for one or more successive states of the reference PN sequence based on the state signal to generate at least one fast-forward PN sequence from each successive state.

24. The method as recited in claim 22, further comprising the step of counting each code-phase based on the initial state and the second clock rate of the fast-forward PN sequence to form a counter value; and step a1) generates the state signal further based on the counter value.

25. The method as recited in claim 22, further comprising step of a2iv) applying at least one mask vector to the fast-forward PN sequence based on the state signal to form the matched-filter vector, the corresponding code-phase offset of the matched-filter vector determined by the mask vector.

26. The method as recited in claim 18, wherein the step a1) generates the state signal to further identify at least one Walsh code, and the step a2) further comprises the step of providing each Walsh code vector based upon the identified Walsh code of the state signal.

27. The method as recited in claim 26, further comprising the step of aligning, in code phase, each Walsh code vector, matched-filter PN vector and the sample vector.

28. The method as recited in claim 26, further comprising the steps of generating a plurality of Walsh code vectors, and storing each of the plurality of Walsh code vectors as an corresponding entry of the Walsh table.

29. The method as recited in claim 17, wherein the one or more processing units are one or more of a search processor, tracking processor and demodulator, and wherein step a) generates the CDMA correlation result with a correlator, the method further comprising the steps of: coupling each processing unit to the correlator with a shared bus, and receiving, by each processing unit, the CDMA correlation result from the shared bus.

30. The method as recited in claim 17, further including the step of repeating steps a) and b) so as to pipeline multiplexed correlations based on each correlation result and the corresponding ID tag associated with each correlation result.

31. The method as recited in claim 30, wherein each different cross-correlation operation of steps a) and b) is performed with at least one matched-filter PN vector, and each of the multiplexed correlations is a vector cross-correlation operation with the sample vector.

32. The method as recited in claim 31, wherein steps a) and b) are performed for different cross-correlation operations of a single complex correlation operation with at least one sample vector.

33. An integrated circuit having a correlator for generating CDMA correlation results for two or more different cross-correlation operations, the correlator comprising:

one or more processing units, each processing unit adapted to 1) perform a cross-correlation operation and 2) generate a CDMA correlation result and a corresponding ID tag from a corresponding sample vector of a CDMA signal; and a vector generator controller adapted to, for each cross-correlation operation, select one or more CDMA correlation results based on the corresponding ID tags.

34. The invention as recited in claim 33, wherein the vector generator controller is adapted to generate, based on each cross correlation operation, the ID tag and a state signal corresponding to at least one matched-filter PN vector; and wherein the correlator comprises:

a vector generator adapted to generate the at least one matched-filter PN vector based on the state signal; and a vector correlator adapted to generate the CDMA correlation result from a vector pair, the vector pair including one matched-filter PN vector and the sample vector, the vector correlator associating the ID tag with the CDMA correlation result.

35. The invention as recited in claim 34, wherein the vector correlator comprises:

a bit-multiplier adapted to receive the vector pair and to combine each bit of the sample vector with a corresponding bit of the matched-filter PN vector to form a correlated vector, the bit-multiplier having a corresponding ID tag register adapted to store the corresponding ID tag of the vector pair as a correlated vector ID tag;

an adder-tree circuit adapted to receive the correlated vector and to combine each bit of the correlated vector to provide a correlation value, the adder-tree circuit having a corresponding ID tag register adapted to store the correlated vector ID tag as a correlation value ID tag, and the correlation value and the correlation value ID tag of the adder-tree circuit ID tag register are provided as the CDMA correlation result and the associated ID tag.

36. The invention as recited in claim 34, wherein the vector generator generates the at least one matched-filter PN vector from a reference PN sequence, the reference PN sequence having an initial state and a first clock rate, the vector generator comprising:

a register adapted to capture an initial state of the reference PN sequence; and a fast-forward PN generator adapted to generate at least one fast-forward PN sequence from the captured initial state, the fast-forward PN sequence having chip values equivalent to chip values of the reference PN sequence and the fast-forward PN generator providing the fast-forward PN sequence having a second clock rate greater than the first clock rate, wherein each matched-filter PN vector corresponds to one fast-forward PN sequence having a corresponding code-phase offset when compared to the code phase of the reference PN sequence.

* * * * *